United States Patent [19]

Cooper

[11] Patent Number: 5,122,785
[45] Date of Patent: * Jun. 16, 1992

[54] SQUEEZABLE CONTROL DEVICE FOR COMPUTER DISPLAY SYSTEM

[75] Inventor: James L. Cooper, Tyngsboro, Mass.

[73] Assignee: Wang Laboratories, Inc., Lowell, Mass.

[*] Notice: The portion of the term of this patent subsequent to Apr. 9, 2008 has been disclaimed.

[21] Appl. No.: 601,033

[22] Filed: Oct. 22, 1990

Related U.S. Application Data

[63] Continuation of Ser. No. 271,126, Nov. 14, 1988, abandoned, which is a continuation-in-part of Ser. No. 206,549, Jun. 14, 1988, Pat. No. 5,006,836.

[51] Int. Cl.[5] ............................................. G09G 5/08
[52] U.S. Cl. .................... 340/710; 273/148 B
[58] Field of Search ............ 340/706, 709, 710, 721, 340/723, 724, 726; 200/6 R, 6 A; 273/148 B; 250/221; 74/471

[56] References Cited

U.S. PATENT DOCUMENTS

| | | | |
|---|---|---|---|
| 4,464,652 | 8/1984 | Lapson et al. | 340/710 |
| 4,786,892 | 11/1988 | Kubo et al. | 340/710 |
| 4,794,386 | 12/1988 | Bedriji et al. | 340/726 |
| 4,816,810 | 3/1989 | Moore | 340/710 |
| 4,818,978 | 4/1989 | Kurihara et al. | 340/710 |
| 4,831,556 | 5/1989 | Oono | 340/723 |
| 4,847,484 | 7/1989 | Kikuchi | 340/710 |
| 4,886,941 | 12/1989 | Davis et al. | 340/710 |
| 5,006,836 | 4/1991 | Cooper | 340/710 |

OTHER PUBLICATIONS

"Lisa Draw", Apple Computer, Inc. copyright 1983, pp. 22-25, 116-125 and 180-181.
"MacPaint", Apple Computer, Inc., copyright 1983, pp. 1-32.

Primary Examiner—Alvin E. Oberley
Assistant Examiner—Richard Hjerpe
Attorney, Agent, or Firm—Michael H. Shanahan; Kenneth L. Milik

[57] ABSTRACT

A squeezable cursor control device provides movement of moveable entities displayed on a computerized display. In one application the squeezable cursor control device provides scrolling of window contents as a function of cursor position relative to the window. The cursor positioned within the window provides short range scrolling upon squeezing of two opposed portions of the control device. The cursor positioned outside the window provides medium and long range scrolling upon squeezing of the control device. Graphical indicators such as directional indications and elevator bars aid selection and specification of medium and long range scrolling. A graphical indicator of a user generated path provides direction and amount of scrolling in short range scrolling.

31 Claims, 10 Drawing Sheets

SQUEEZABLE CONTROL DEVICE FOR COMPUTER DISPLAY SYSTEM

This is a continuation of co-pending application Ser. No. 07/271,126 Filed on Nov. 14, 1988, now abandoned which is a continuation-in-part of Ser. No. 206,549 filed Jun. 14, 1988, now U.S. Pat. No. 5,006,836.

BACKGROUND OF THE INVENTION

With the advent of computer controlled display systems, variations in control devices became of interest in the art. Traditionally, a keyboard was used to control the display and items within the display. However, keyboards were soon found to be awkward or inefficient for controlling a cursor or the like in a display for graphical purposes. Subsequently, a cursor control device commonly referred to as a mouse was developed and found to be more effective as a means for controlling a cursor in the display.

Various mouse-type cursor control devices have been disclosed such as in U.S. Pat. No. 4,464,652 to Lapson et al. Generally the disclosed mouse devices provide a means for moving a display cursor in a pattern relative to the movement of the mouse on a surface of use and a means for providing selective signals to the computer for effecting changes in the display. Typically, the signal generating means is a switch which is to be operated in various manners to provide different effects. For example, in one manner of operation, the switch is maintained in a depressed position while the mouse is moved across the surface to generate a display of the options available to the user at that time. In another manner of operation, the switch is depressed and released in a single click fashion to indicate selection of a displayed item. In another manner, the switch is depressed and released twice to provide selection of other items. Such manners of operation are often confusing and tiring to the user. As a result, incorrect selections are made where a single click is used instead of a double click or vice versa.

Accordingly, there is a need for simplified motions for operating a mouse-type cursor control device.

SUMMARY OF THE INVENTION

The present invention provides an improved control device, such as a mouse, which is responsive to a squeezing force applied by the user to generate computer display control signals. In particular, the control device according to the present invention features two opposed outward facing portions which are to be grasped and moved by a squeezing force applied by one hand of an operator. The control device has a pressure operated switch installed so as to be switched to a first state by a squeezing force below a threshold force applied to the two opposing portions and switched to a second state by a squeezing force above the threshold force applied to the two opposing portions. The pressure operated switch thus controlled by the operator is used to provide signals to the associated computer.

In one embodiment of the present invention, the squeezable cursor control device generally provides user repositioning of moveable entities displayed in the screen view. Use of the squeezable cursor control device is as follows. With the squeezable cursor control device, the operator positions the cursor on an entity desired to be moved within the displayed screen view, squeezes the two opposing portions of the device above the threshold force and thereby selects the entity. The squeezing force applied above the threshold force generates signals to the associated computer to effect selective movement of the moveable entity which is currently designated by the cursor. Thereafter, while maintaining the squeezing force above the threshold, the operator moves the cursor to the screen view position desired for the selected entity. Upon release of the squeezing force, the screen view is displayed in a rearranged or reformatted manner with the selected entity in the desired position on the screen view. Alternatively, movement of the entity is displayed in correspondence with movement of the cursor while the squeezing force is maintained. Upon release of the squeezing force, movement of the entity, but not the cursor, ceases with the screen view displaying the entity positioned at its screen location when the squeezing force was released.

The moveable entities include icons, menus, whole windows and designated blocks or units or text, to name a few. Other entities may similarly be moved.

In another embodiment, the squeezing force applied above the threshold force generates signals to the associated computer to initiate scrolling of a view exhibited on the monitor screen of the display system. The scrolling of the view is completed with the decrease in squeezing force below the threshold force. In a particular example the control device includes a motion transducer which responds to the movement of the device over a table surface to control the movement of a cursor or some displayed feature over the face of the display. If the user moves the cursor to an initial position within a displayed window or "active area" and thereafter squeezes the two opposing portions of the device, the contents of the window are scrolled in a manner and in a direction which is dependent on position of the cursor. Specifically, after squeezing, if the cursor is positioned in a non-central region of the window and is not significantly moved thereafter for a predefined length of time, then the contents of the window are scrolled in a direction generally toward an opposite region through the center of the window until the user stops squeezing the opposing portions of the device.

On the other hand, significant subsequent movement of the device, while the two opposing portions thereof are being squeezed above the predetermined threshold, repositions the cursor with respect to the initial cursor position and defines a path of movement from the initial cursor position. Upon release of the two opposed portions, the window contents are scrolled along the defined path, that is in an amount and direction defined by the path.

If the user initially moves the cursor to a position outside the window or "active area" and thereafter squeezes the two opposing portions above the predetermined threshold, the contents of the window are scrolled in a manner dictated by elevator bars or directional indicators. In the case of directional indicators, while squeezing the opposing portions of the device the user positions the cursor over a desired directional indicator and stops squeezing to select the scrolling direction indicated by the directional indicator. In turn the window contents are scrolled one unit (e.g., one page length, one page width, one window load of columns or rows) in the indicated direction. If the user continues to squeeze the opposing portions once the cursor is positioned over a desired directional indicator, the window contents are repeatedly scrolled, a unit at a time, in the indicated direction until the user stops squeezing.

In the case of elevator bars, while squeezing the opposing portions, the user positions a movable marker in the horizontal or vertical elevator bar to indicate a desired new position of the window contents and subsequently releases the opposing portions to effectuate scrolling in the manner prescribed by the newly positioned elevator bar marker.

BRIEF DESCRIPTION OF THE DRAWINGS

The foregoing and other objects, features and advantages of the invention will be apparent from the following more particular description of illustrative embodiments of the invention, as illustrated in the accompanying drawings in which like referenced characters refer to the same parts throughout the different views. The drawings are not necessarily to scale, emphasis instead being placed upon illustrating principles of the invention.

DETAILED DESCRIPTION OF THE PREFERRED EMBODIMENT

Figure 1:
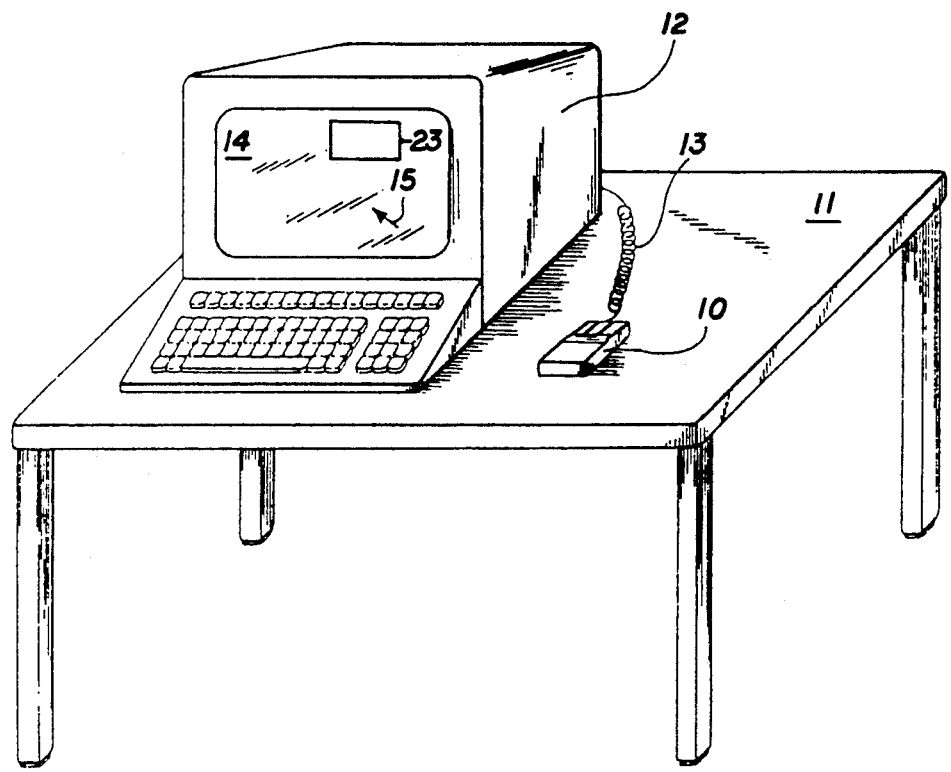
FIG. 1 shows a mouse according to the invention positioned on a table and connected to control the position of a marker arrow on a display of a computer.

Control mouse 10, according to the invention, is shown in FIG. 1 resting on horizontal engagement surface 11 and connected to computer 12 through cable 13, which provides a communications channel. Computer 12 includes a screen 14 which has a marker or cursor such as arrow 15 displayed in a view thereon.

Mechanical and electrical details of mouse 10 are provided in the parent application Ser. No. 206,549 and are herein incorporated by reference. These details are repeated hereafter only to the extent necessary for understanding the present invention.

Figure 3:
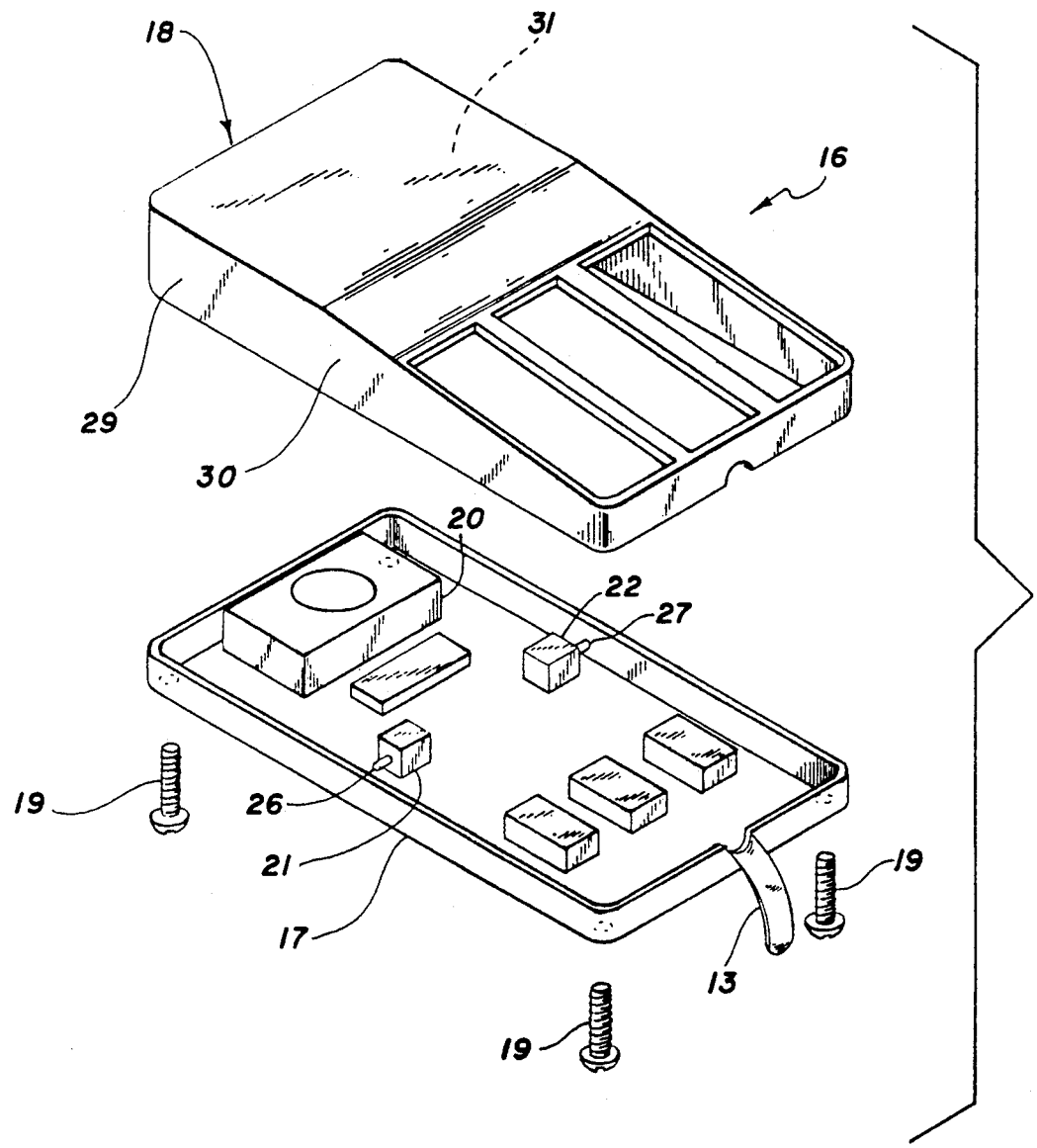
FIG. 3 shows the mouse of FIG. 1 with its case opened to reveal internal components.

As shown in FIG. 3, mouse 10 includes case 16 having base portion 17 and cover 18 attached thereto by screws 19. On base 17 are mounted, among other components, motion transducer 20, and pressure operated switches 21 and 22 which are positioned near opposed edges of base 17 and have their operating mechanisms 26, 27 directed outwards. Switches 21 and 22 are connected in series and are considered together as a single composite switch which is closed if both switches 21, 22 are closed through operating mechanisms 26, 27 and otherwise open. Cable 13 provides means for communicating motion signals from transducer 20 and switch state signals from the switches 21,22 to computer 12.

Cover 18 includes vertical circumferencing wall 29 with outward facing digit-engaging portions 30 and 31 in opposed positions on the vertical wall so that they can receive a squeezing force applied by two digits of an operator who is grasping the mouse controller in his hand. The wall 29 is resiliently flexible so that when portions 30, 31 are squeezed toward each other, the wall 29 locally moves inward and presses against operating mechanisms 26, 27 of switches 21, 22.

Figure 2:
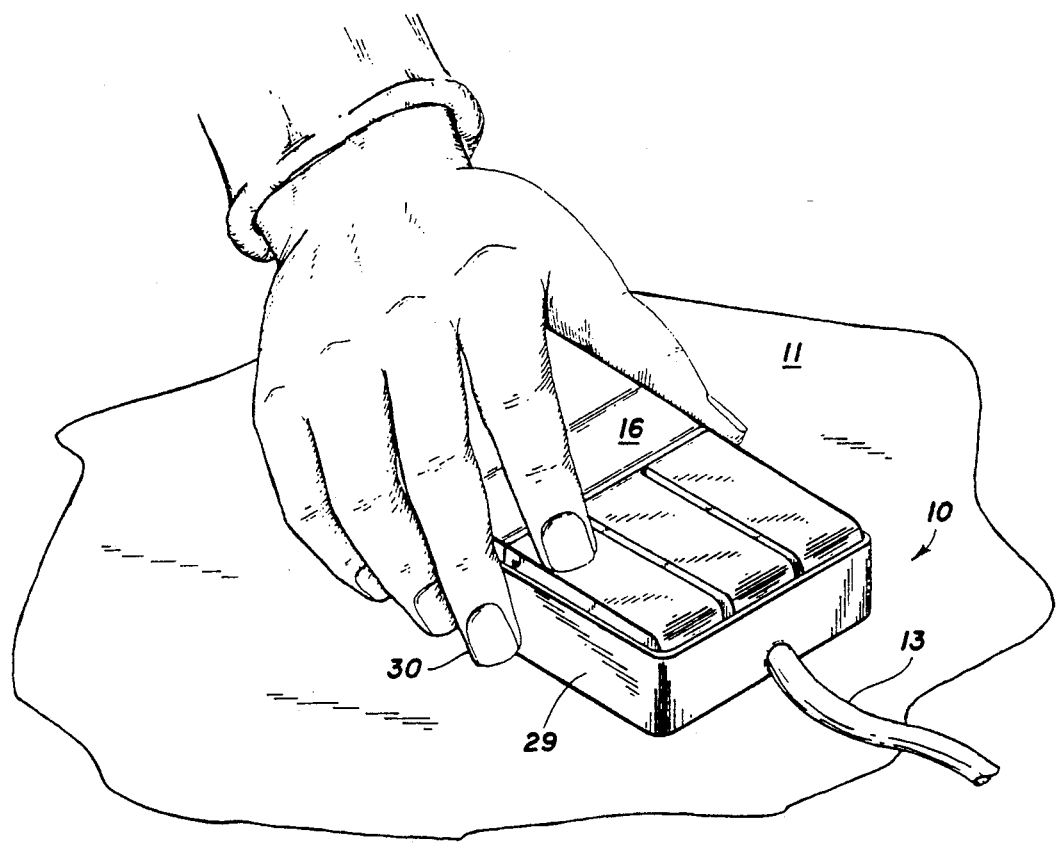
FIG. 2 shows the mouse of FIG. 1 held in the hand of an operator.

The operation of the mouse 10 in conjunction with a view displayed on screen 14 is illustrated in FIG. 2 and FIGS. 4a-5d, the latter figures illustrating the various views displayed during operation of the mouse 10. As shown in FIG. 2, an operator grasps the mouse 10 in his hand in a conventional manner with his thumb in contact with portion 31 of wall 29 and a finger in contact with portion 30. The operator exerts a certain amount of squeezing force between his thumb and finger sufficient to maintain his grasp and effect movement of the mouse on the surface 11 but less than a predetermined actuation threshold force required to throw switches 21 and 22 from their first state to their second state. Thus holding the mouse 10, the operator controls the motion of arrow 15 in the view displayed on screen 14 by moving the mouse on table surface 11.

When the operator wishes to send to the computer 12 a signal to effect movement or repositioning of a moveable entity other than the cursor 15 such as an icon, menu or window 23 displayed in the view, he positions arrow 15 on the desired moveable entity, and subsequently squeezes harder between his thumb and finger raising the squeezing force above the predetermined threshold force. Under this increased squeezing force the wall 29 is flexed inward and throws composite switch 21-22 from its first state (i.e. open) to its second state (closed). In turn, the switches 21, 22 provide a signal to the computer to initiate an operation for repositioning the moveable entity on which the arrow 15 is currently positioned. After thus signalling to the computer, the operator makes a selection of a desired new position, to which he wishes the moveable entity to be moved. This is accomplished by the operator further moving the mouse 10 and thus generating motion signals from the transducer 20 to reposition arrow 15 to the desired new position in the displayed view, while continuing to squeeze the portions 30, 31 of the mouse at a level above the predetermined threshold. Upon placement of the arrow 15 at the new position, the operator releases the squeezing force to a level below the predetermined threshold. This throws composite switch 21-22 from its second state (closed) to its first state (open) and provides a signal to the computer to complete the repositioning operation by displaying a reformatted or rearranged view with the desired moveable entity positioned at the new position selected by the user.

Common routines for redrawing or reformatting screen views are used to perform the foregoing. The signals generated upon the subsequent opening of switch 21-22 provide an indication of screen position of the desired entity for the resulting view. The remaining parts of the view are redrawn accordingly as is known in the art.

In some applications which support a displayed view, the computer may provide in the displayed view a showing of the desired moveable entity in motion from its initial position to the new position. The movement of the desired moveable entity is in a pattern which corresponds to the user determined movement of the arrow 15 during the continued squeezing of the sides of mouse 15 and movement of the mouse across table surface 11. In such a case, the operator is provided with visual effects for the whole repositioning operation from an initial selection of the desired moveable entity (by the operator positioning arrow 15 on the entity and sufficiently squeezing the mouse 10). through movement of the selected entity across the screen 14 to a new screen position (by the operator moving mouse 10 and hence arrow 15 while continuing to squeeze mouse 10), to placing the selected entity at its new position (by the operator adequately releasing the squeezing force once the arrow 15 and hence selected entity is at the new screen position).

Again, routines known in the art are used to implement the foregoing, especially routines for displaying movement of a moveable entity in correspondence with user movement of a cursor.

In a text processing application it is not necessarily helpful to provide the operator a display of the selected moveable entity in motion from its initial position to its new position. In such an application use of the repositioning operation to rearrange a screen view of text may be implemented as follows. First the operator designates a unit or block of desired text for relocation by common methods such as by keys on a keyboard connected to the computer. The operator then positions arrow 15 on the designated block of text by moving mouse 10 on table surface 11 and thereafter sufficiently squeezes the sides of mouse 10 to provide the signal to the computer to initiate the repositioning operation. While maintaining the squeezing force above the predetermined threshold, the operator moves mouse 10 and thus arrow 15 to the position desired for the designated block of text. Arrow 15 alone is shown in motion during movement of mouse 10 while the squeezing force is maintained above the predetermined threshold. After placing arrow 15 in the desired new position, the operator releases the squeezing to a level below the predetermined threshold. This generates a signal to the computer to complete the repositioning operation by displaying the screen view of text reformatted with the designated block of text at the user desired new position. Known text formatting routines are employed by the computer to accomplish the foregoing.

In addition to the repositioning operation, in certain applications the squeezing of the sides of mouse 10 to close switches 21-22 may generate signals to the computer 12 to initiate a scrolling operation. After thus signaling to the computer, the operator may cause scrolling in a particular manner or direction by continuing to squeeze the sides of the mouse at a level above the predetermined threshold force while either further moving the mouse and generating motion signals from the transducer 20 or keeping the mouse relatively stationary for a predefined length of time. Thereafter, the operator may relax the squeezing force between portions 31 and 30 below the predetermined threshold force, with the result that the switches are opened and the circuit through switches 21 and 22 provides a signal through cable 13 to the computer which subsequently completes the scrolling operation.

In a preferred scheme, the computer 12 provides so called short, medium and long range scrolling of the window contents as a function of position of the cursor 15 with respect to the outer boundaries of window 23. The short, medium and long range scrolling are defined according to the application supporting the window 23, that is the program or task being performed in the window. For example, in a text editing task window in which a document is displayed, short range scrolling provides repositioning of the currently displayed page of the document, while medium and long range scrolling provides paging through the document, a page at a time in the case of medium range scrolling and any number of pages at one time in the case of long range scrolling. In a spread sheet application, medium range scrolling changes the window contents from a window load of columns or rows to the next window load of columns or rows, for example. Other applications are understood to similarly define the different ranges of scrolling in accordance with respective units employed in the applications.

Figure 4A:
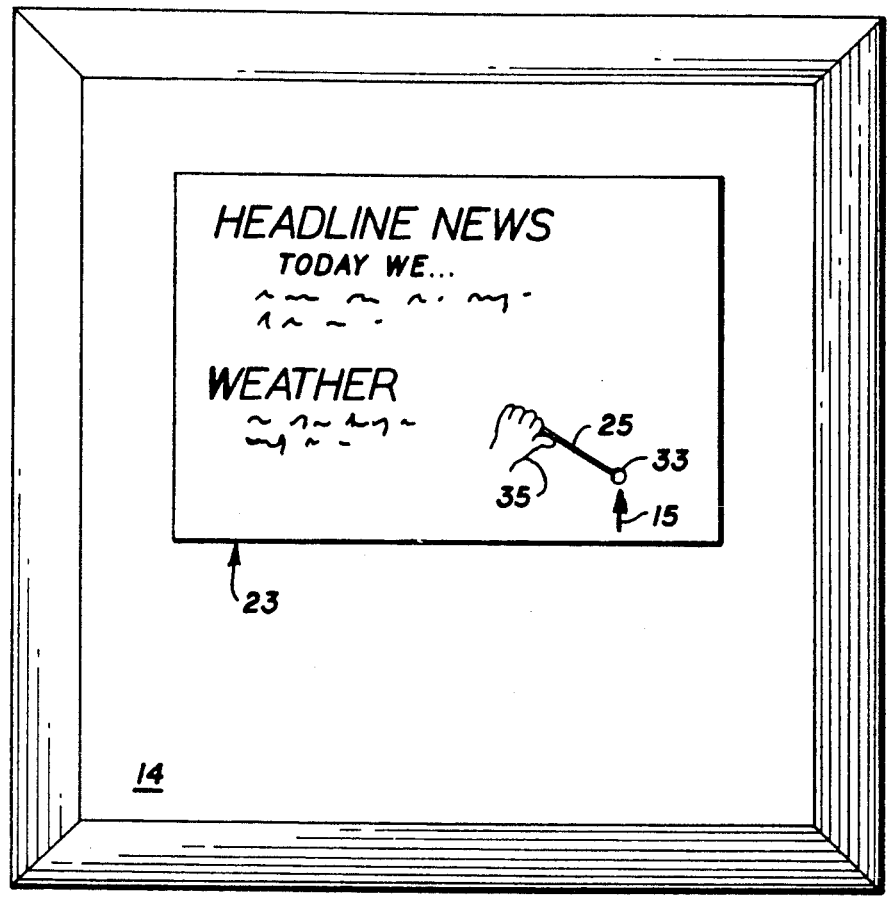
FIGS. 4a and 4b are illustrations of short range scrolling of the contents of a window with the mouse of FIG. 1.

Generally the user initiates the short range scrolling of the contents of window 23 by positioning the arrow 15 within the outer boundaries of window 23 and squeezing the opposed portions 30 and 31 of the mouse 10 above the predetermined threshold. In response to such squeezing with arrow 15 positioned within window 23, the computer 12 displays an indication 33 of the initial position or origin of arrow 15 with respect to this term of short range scrolling as shown in FIG. 4a. While maintaining the squeezing force between portions 31 and 30 above the predetermined threshold force, the user may move the mouse 10 to reposition arrow 15 within window 23. If such repositioning is at least a predetermined distance and within a predetermined time, such as 3/4ths of a second, computer 12 displays a rubber band 25 or other indication of the movement of the cursor relative to its original position 33. Also arrow 15 is now displayed as a hand cursor 35 which corresponds to subsequent movement of mouse 10 as shown in FIG. 4a. As the user moves the cursor 35 to a new position, the rubber band indication 25 provides a path from the original position 33 to the new cursor position. The length and radial orientation of the path formed by the rubber band indication 25 from origin 33 corresponds to the amount and direction respectively, of which the contents of window 23 will be scrolled upon release of the opposed portions 30, 31 of the mouse 10. Hence, as illustrated in FIG. 4a, the contents of window 23 will be scrolled up and to the left upon release of the opposed portions 30, 31 with the cursor 35 positioned as shown relative to an initial position 33.

In other embodiments of the present invention, the rubber band indication 25 and hand cursor 35 may not be illuminated. Instead, movement of cursor 15 from the origin 33 results in real time movement of the window contents as long as the squeezing of opposed portions 30, 31 is maintained above the predetermined threshold. Such scrolling is accomplished by a routine which in immediate response to cursor movement calculates the change in cursor position from original position 33 and immediately moves the window contents via a respective bitmap in accordance with the calculated change in cursor position.

Figure 4B:
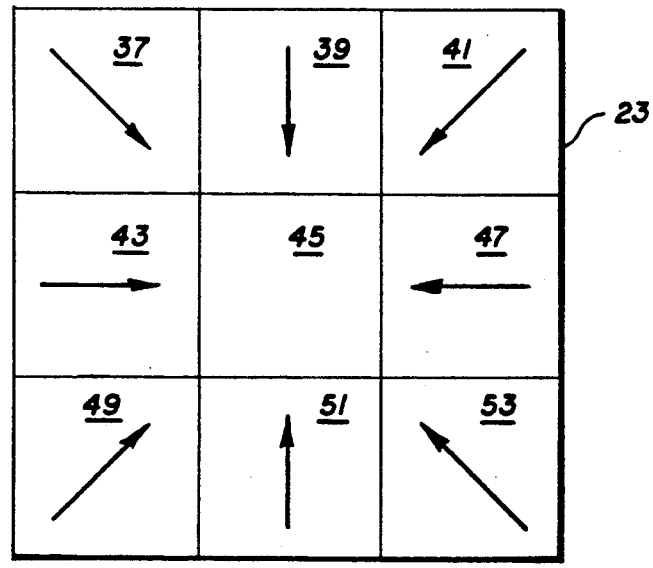

On the other hand, after having positioned the arrow 15 within the boundaries of window 23 and having squeezed opposed portions 30 and 31 above the threshold force, if the user maintains that squeezing force without further moving arrow 15 then the contents of window 23 are automatically scrolled in a direction which is determined as a function of the position of arrow 15. Specifically, window 23 is uniformly divided into nine segments 37, 39, 41, 43, 45, 47, 49, 51 and 53 as illustrated in FIG. 4b. If arrow 15 is positioned in segment 37 then the contents of window 23 are automatically scrolled in a direction down and to the right. If arrow 15 is positioned in segment 39 then the contents of window 23 are scrolled in a generally downward direction. If arrow 15 is positioned in segment 41 then the contents of window 23 are automatically scrolled in a direction down and to the left. If arrow 15 is positioned in segment 43 then automatic scrolling is in a rightward direction. If arrow 15 is positioned in segment 47 then automatic scrolling is in a leftward direction. If arrow 15 is positioned in segment 49 then scrolling of the contents of window 23 is in an upward and to the right direction. If arrow 15 is positioned in segment 51 then scrolling is in a generally upward direction. If arrow 15 is positioned in segment 53 then scrolling is generally in an upward and to the left direction. If arrow 15 is positioned in central segment 45 then no automatic scrolling is provided. Generally, the automatic scrolling is provided at a rate of one inch per second to provide a display which is fairly readable by the user during scrolling.

Preferably, the segments of FIG. 4b are not illuminated but are generally known by the user during operation of the mouse 10. In some embodiments however, the segments together with their respective direction indicators of the window 23 may be illuminated to provide the user with a visual aid for such automatic scrolling.

Figure 5A:
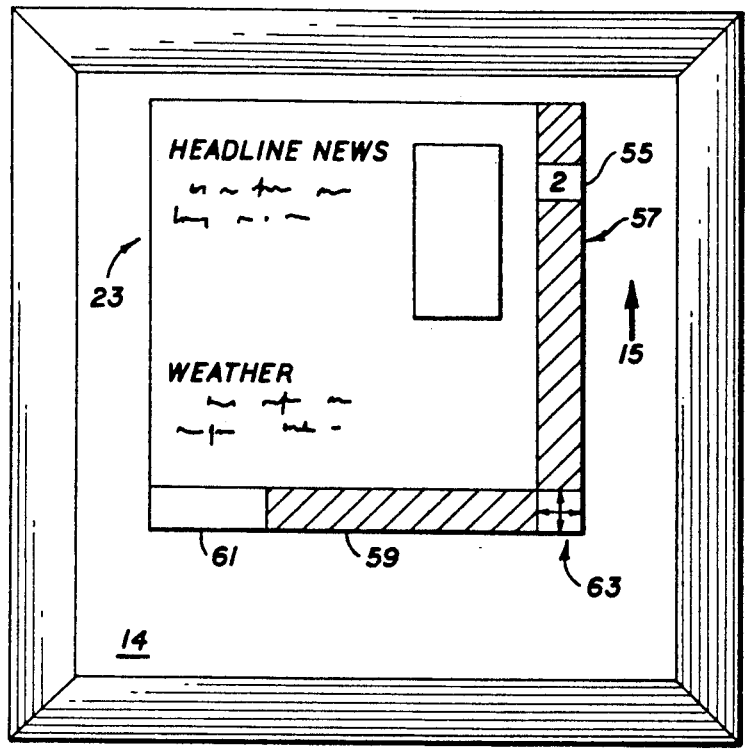
FIGS. 5a-5d are illustrations of medium and long range scrolling of the contents of a window with the mouse of FIG. 1.

To initiate medium and long range scrolling of the contents of window 23, the arrow 15 must be positioned outside of window 23 at the time of squeezing opposed portions 30 and 31 above the predetermined threshold. Upon such squeezing, elevator bars 59, 57 for scrolling in the horizontal as well as vertical direction are illuminated as shown in FIG. 5a. Also illuminated is a directional indicator 63 for medium range scrolling. To select a direction in which the medium range scrolling is desired to be performed, the user moves arrow 15 to the directional indicator 63 while maintaining the squeezing above the threshold force. By positioning arrow 15 on one of the arrowheads of directional indicator 63 and releasing the squeezed portions below the threshold amount, a medium range scrolling of the contents of window 23 in the direction of the chosen arrowhead is performed.

Figure 5B:
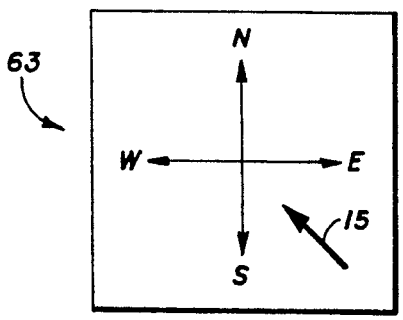

Preferably, the directional indicator 63 provides four arrowheads (N, S, E, W) pointing radially outward from a central position in an orthogonal pattern common to the major points, north, south, east and west, of a geographical compass as shown in FIG. 5b. If the user does not release the squeezing pressure below the predetermined threshold while the arrow 15 is positioned on an arrowhead of the directional indicator 63 for a predetermined length of time, then scrolling is provided automatically, a unit at a time, in the direction of the arrowhead in a continuous fashion until the opposed portions 30, 31 of the mouse are released. The unit of scrolling is a function of the application which provides the contents of window 23 as previously mentioned. Thus, the scrolling is in the direction of the chosen arrowhead and in an amount of a page at a time in the case of a document or a row or column at a time, in the case of a spreadsheet, and so forth in other cases.

To aid the user in making a selection of an arrowhead, N, S, E, W, an arrowhead is highlighted upon the arrow 15 being positioned over or placed in contact with the arrowhead. Such highlighting and/or dimming of arrowheads as a function of relative position of arrow 15 is accomplished by methods known in the art.

Figure 5C:
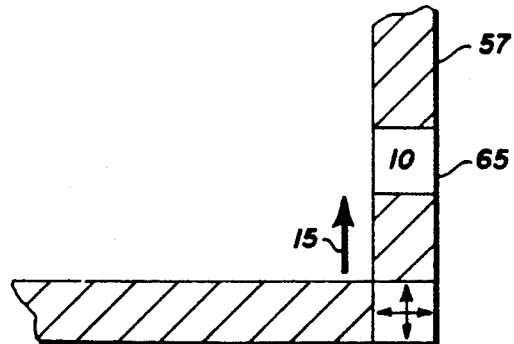
Figure 5D:
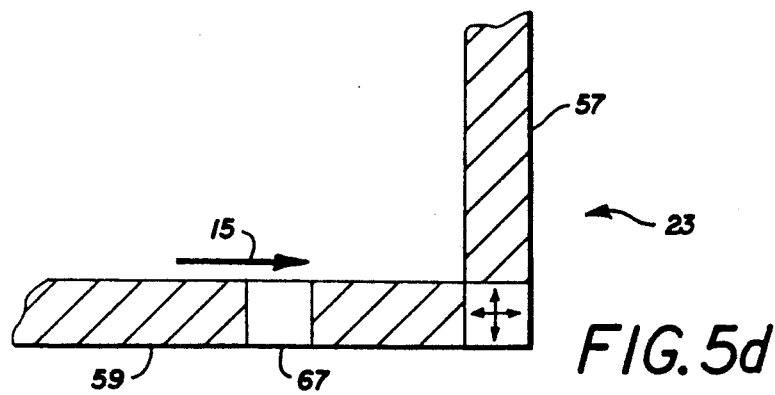

For long range scrolling, the arrow 15 is initially positioned outside of the window 23 and the mouse is squeezed above the predetermined threshold. Upon such squeezing, vertical and horizontal elevator bars 57, 59 are initially displayed with indications 55, 61 of current vertical and horizontal positions of the window contents. Preferably, the current position indicators 55, 61 are also positioned within respective elevator bars 57, 59 relative to other potential positions so as to give a visual illustration of relative current window position (e.g. top, middle, end of document). While maintaining the squeezing pressure above the predetermined threshold, the user moves the arrow 15 to cross one of the elevator bars 57 or 59 and to be positioned within the window 23 as illustrated in FIGS. 5c and 5d. Upon the arrow 15 crossing the elevator bar 57 or 59, the elevator bar 57 or 59 becomes highlighted to indicate that further movement of arrow 15 will correspond to the unit of change (e.g. page) indicated by the moveable indicator 65, 67 of that elevator bar. That is, as shown in FIG. 5c after arrow 15 has crossed the vertical elevator bar 57 from outside the window 23 to inside the window, repositioning arrow 15 along the length of vertical elevator bar 57 causes illumination of an indication 68 of the unit which corresponds to the relative position of arrow 15 with respect to the length of the elevator bar 57. Hence, repositioning arrow 15 to a base portion of the elevator bar 57 causes illumination of a page number or the like toward the end of the document or the like being displayed in window 23. Release of the mouse portions 30, 31 causes that page to be displayed in window 23. Thus, scrolling is immediate from the current page or vertical unit position to the page/vertical unit position selected through the vertical elevator bar 57.

In a similar fashion, as shown in FIG. 5d, upon arrow 15 making contact with the horizontal elevator bar 59, subsequent movement of arrow 15 within window 23 along the length of elevator bar 59 provides selection of a horizontal change of the contents of window 23. The horizontal elevator bar 59 and its moveable marker 67 are illuminated and provide an illustration of relative change in horizontal position corresponding to the position of the arrow 15. Once arrow 15 is positioned such that a user desired position of the window contents is indicated by relative position of moveable marker 67 with respect to the length of horizontal elevator bar 59, release of the opposed portions 30, 31 below the predetermined threshold provides a change in contents of window 23 to the column or section of the document which corresponds to the horizontal position indicated by marker 67 in horizontal elevator bar 59.

It is understood that changes in shape or lighting of the moveable markers 65, 67 may be used during use of the elevator bars 57, 59 to provide contrast to the indicators 55 and 61 which indicate current position of the contents of the window 23.

Figure 6A:
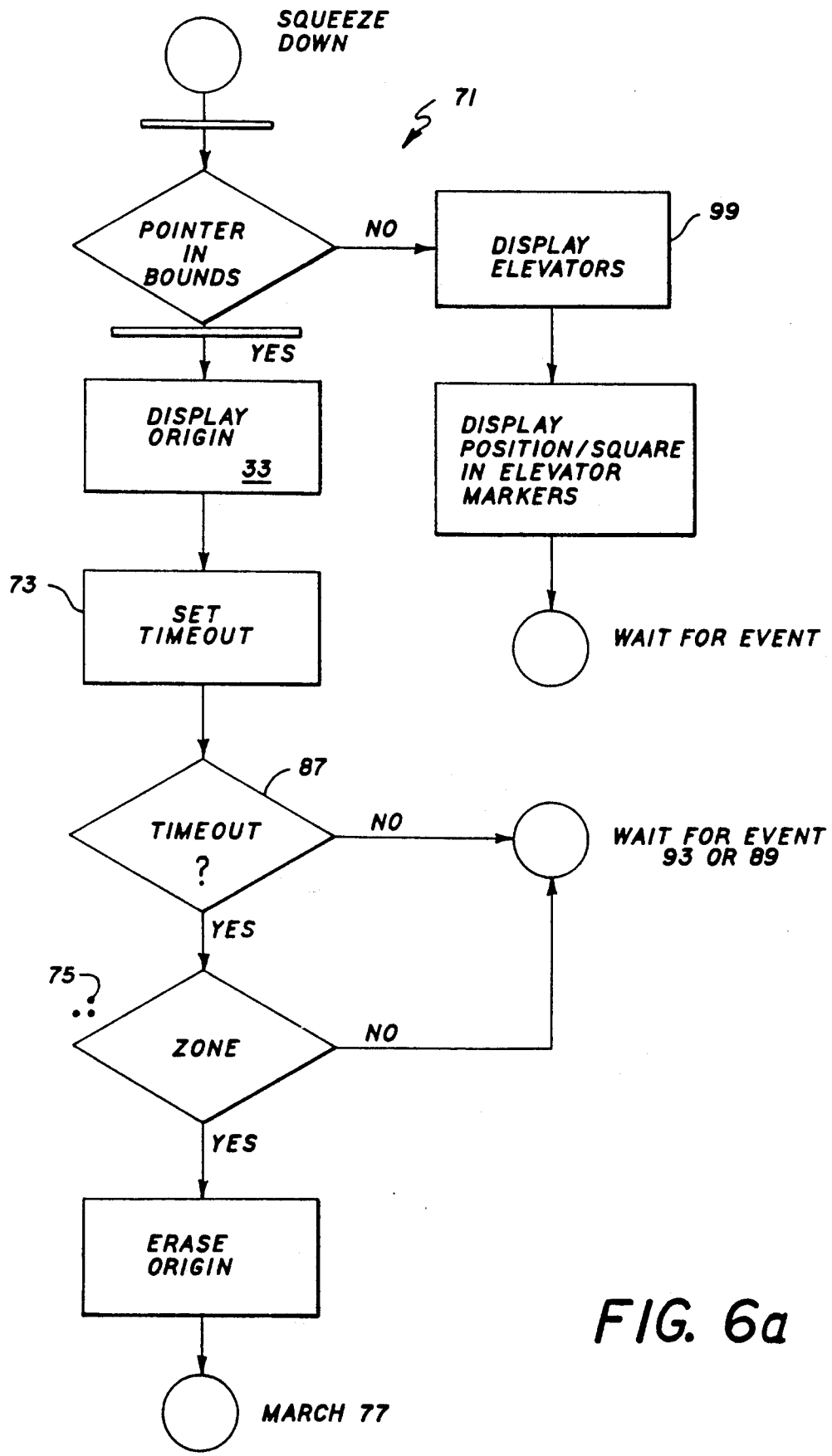
FIGS. 6a-6e are flow diagrams of the program which provides the scrolling features of the mouse of FIG. 1.

The foregoing features are implemented by a software program outlined in FIGS. 6a–6e. In general, once the mouse has been squeezed above the predetermined threshold, an events manager detects the signals generated from the mouse 10 and calls the application (i.e. the program running the task in the window) to provide the short, medium and/or long range scrolling as a function of position of arrow 15. As shown in FIG. 6a, upon such squeezing an initial routine 77 "squeeze dwn", is called. The routine 77 determines whether the arrow cursor 15 is within the window bounds or not. If the cursor is, then a flag is set to indicate that short range scrolling is to be initiated and a marker is displayed to indicate the origin 33 of this term of short range scrolling. A clock for timing the pre-determined length of time for movement is begun at 73 in FIG. 6a. If the predetermined amount of time passes before the user moves the cursor 15 then the automatic scrolling routine is initiated at 75. During the initiation of this routine, the position of the cursor 15 is detected with respect to the 9 segments of the window. If the cursor is in any one of the segments 37, 39, 41, 43, 47, 49, 51, 53, except central segment 45, then the origin 33 is erased from the display and the automatic scrolling routine "March" 77 is performed.

Figure 6B:
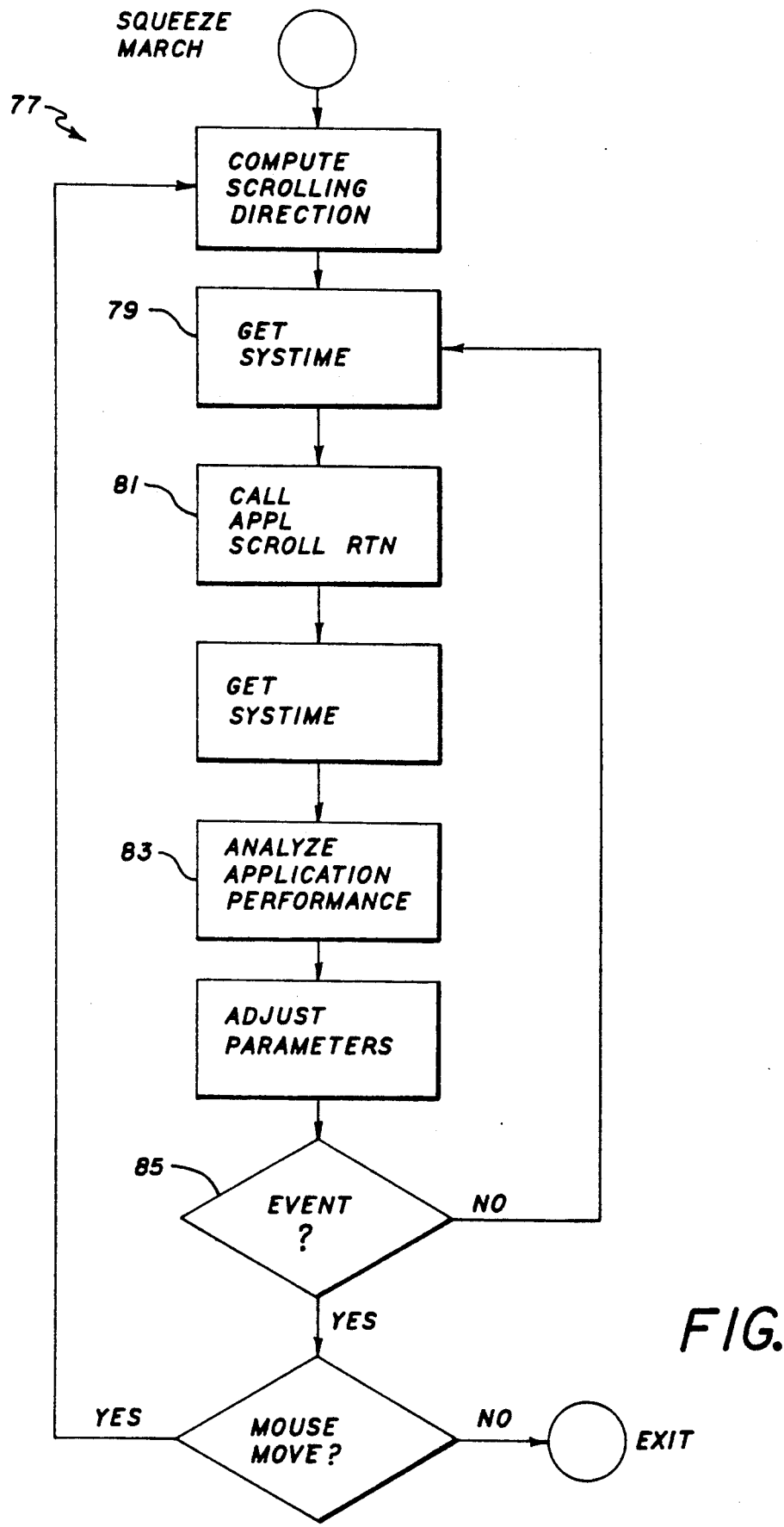

The automatic scrolling routine 77 is outlined in FIG. 6b. Upon entry into the automatic scrolling routine 77, the direction of scrolling is computed with respect to the segment in which the cursor is currently positioned. Once the direction is computed, the application is called with the pertinent scrolling information obtained at 79, and the application provides a scrolling routine 81 in accordance with the pertinent information, such as direction and amount of scrolling as defined by the application. Upon return from the application scrolling routine 81, the performance of the application scrolling routine is analyzed at 83 in FIG. 6b. Adjustment of parameters is made to maintain a one inch per second movement of the window contents on the terminal screen 14. The calling of the application scroll routine 81 and adjusting of parameters continues as long as the cursor is not moved and the squeezing of the mouse is maintained above the threshold amount. Other system timing factors are sampled at 79 to enable the one inch per second movement of the contents of the screen.

Upon movement of the cursor to another segment, the automatic scrolling routine 77 is restarted with the step of computing the scrolling direction in accordance with the new segment in which the cursor has been repositioned. If squeezing of the mouse is detected at 85 to fall below the threshold amount then the automatic scrolling routine 77 stops scrolling the contents of the window and exits to the application.

In the flow chart of FIG. 6a where the mouse is moved before the predetermined amount of time passes at 87, control is returned to the application to detect movement of the cursor 15 or release of the opposed mouse portions 30, 31 below the predetermined threshold. If the squeezing is detected to fall below the threshold then routine "Release Squeeze" 89 is performed as shown in FIG. 6e. In this instance the mouse was released during a short range scrolling term. Hence, any display of the rubber band 25 is erased and any scrolling as indicated by the length and direction of the rubber band 25 is performed by the Application scrolling routine 81. Where the mouse was released without movement of the cursor then the scrolling routine is exited at 91 in FIG. 6e.

Figure 6C:
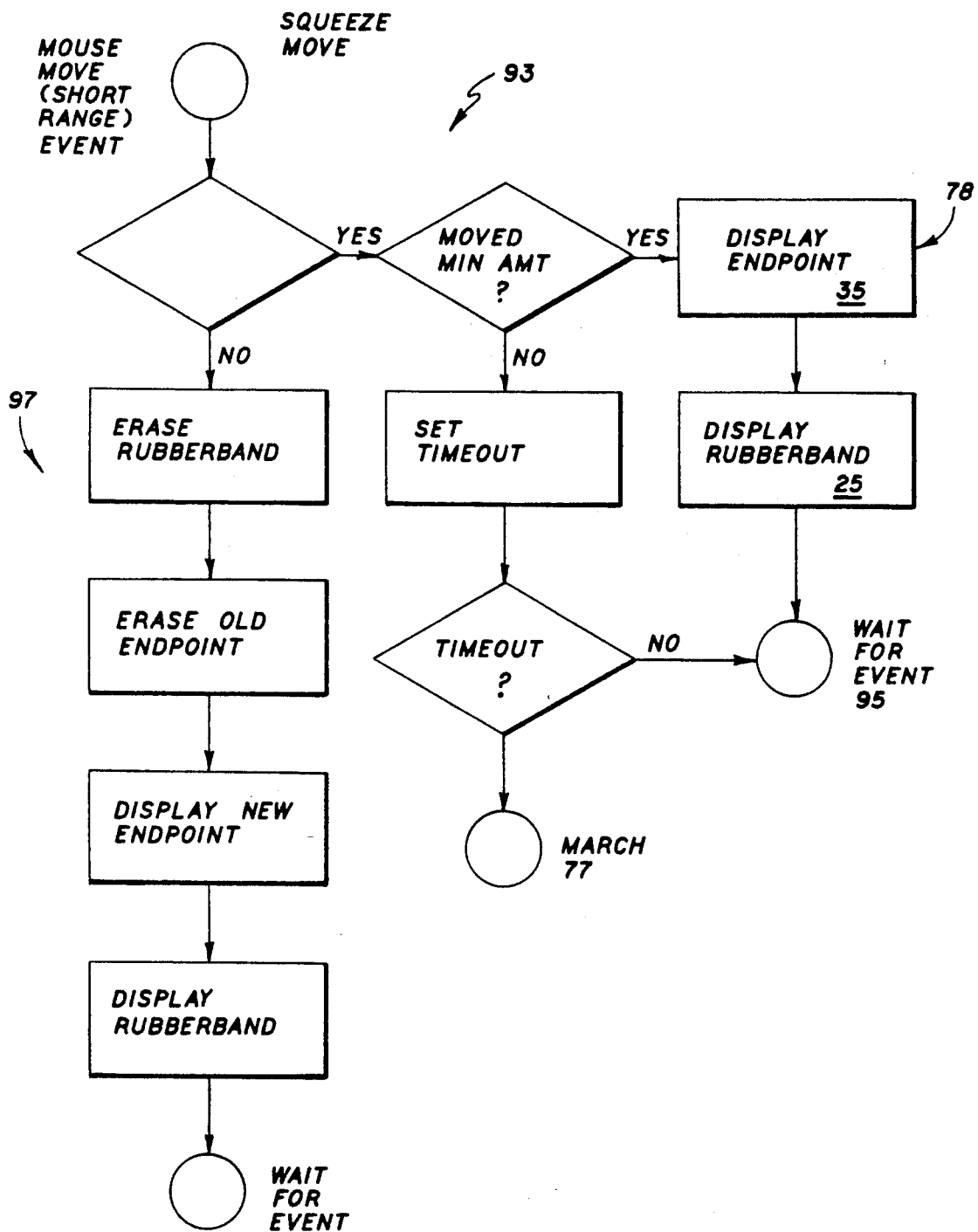

If the mouse is moved at 87 in FIG. 6a then the short range scrolling routine 93 is performed as shown in FIG. 6c. If this is the first time that the short range scrolling routine 93 has been called then the cursor 15 is detected for movement greater than a predefined minimum amount. If the cursor 15 has not been moved more than the predefined minimum amount then a clock is checked for passage of a pre-determined length of time. If cursor 15 is not moved during that predetermined length of time then the automatic scrolling routine "March " 77 as described above in FIG. 6b is performed. If the cursor 15 was moved more than the predefined minimum amount, then the hand cursor 35 is displayed at 98 to provide an indication of the change in cursor position for this term of short range scrolling. Also displayed is the rubber band 25 indicating the direction and amount of movement of the cursor 35 from the origin 33. The length and direction of the rubber band with respect to the origin 33 corresponds to the direction and amount of movement of the mouse 10 from its original position at the time of invoking the short range scrolling. The application then waits at 95 for subsequent cursor movement or release of the mouse.

In a subsequent moving of the hand cursor 35, part 97 of short range routine 93 is performed. The previous rubber band and previous hand cursor 35 are erased and a new rubber band and new hand cursor 35 are displayed in accordance with movement of the mouse and hence, cursor movement. If the mouse was released after movement of the hand cursor 35 to the desired position then the "Release Squeeze" routine 89 of FIG. 6e is called. From the short range routine 93 upon release of the squeezing, the rubber band 25 is erased from the display and the application scroll routine 81 is performed. During the application scroll routine 81 an x-y coordinate position of the origin 33 is determined and an x-y coordinate position of the final hand cursor 35 position (i.e. the cursor 35 position at the time of release) is determined. From the determined x-y coordinates a change in x position and a change in y position are determined. The amounts of changed x and y positions are used to determine the direction and amount in which to move the contents of the window 23 such that scrolling is provided in accordance with the user desired stretching and placement of the rubber band 25.

Referring back to FIG. 6a, if the arrow 15 was initially outside of the window boundaries upon squeezing of the mouse 10 then the elevator bars 57, 59 and directional indicator 63 are displayed at 99. Also displayed are position markers 55, 61 within the elevator bars 57, 59 which indicate the current vertical and horizontal position of the contents of the window 23. Control is passed to the application routine which thereafter waits for movement of the cursor or release of the squeezing pressure below the predetermined level.

Figure 6D:
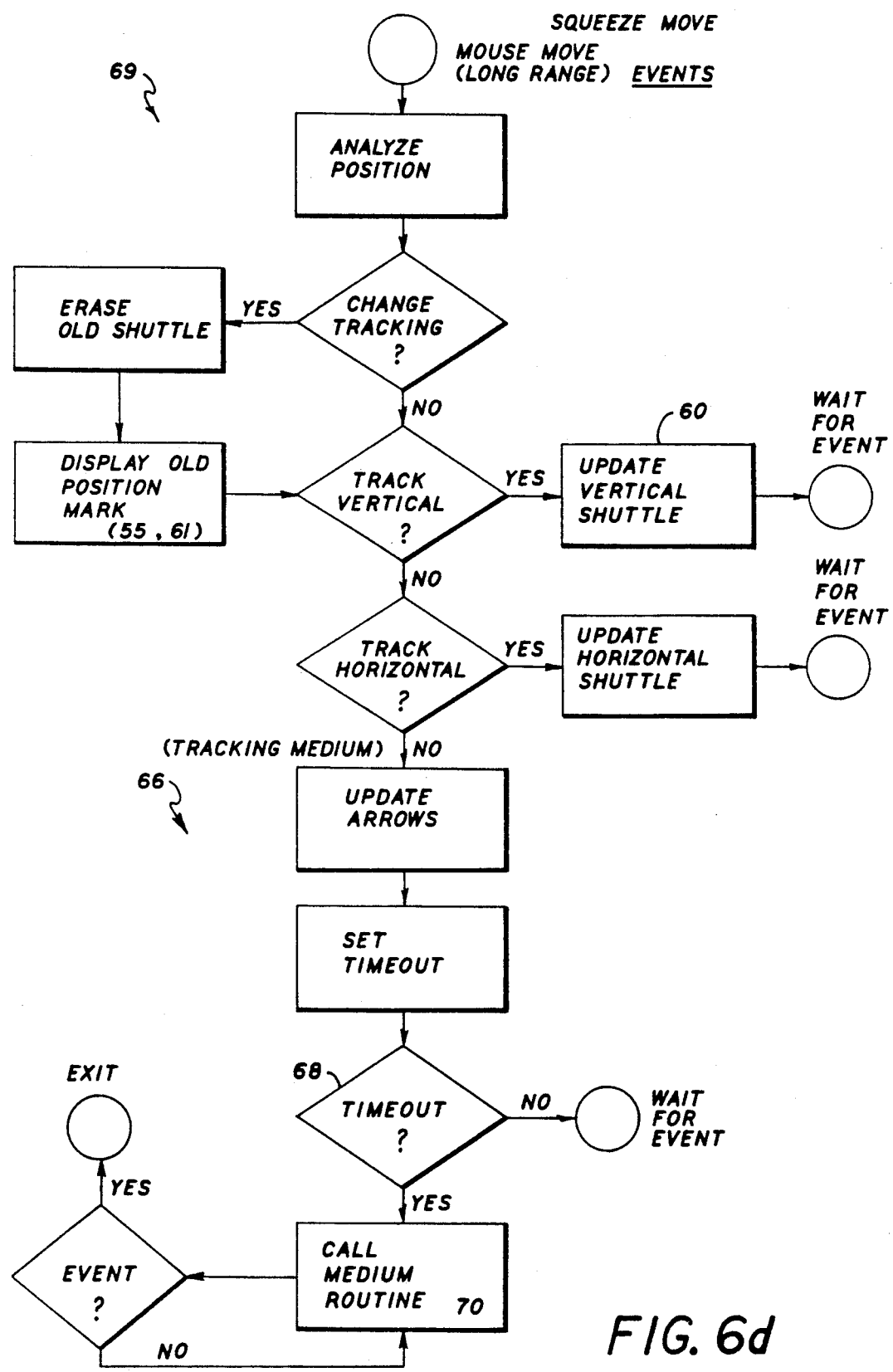
Figure 6E:
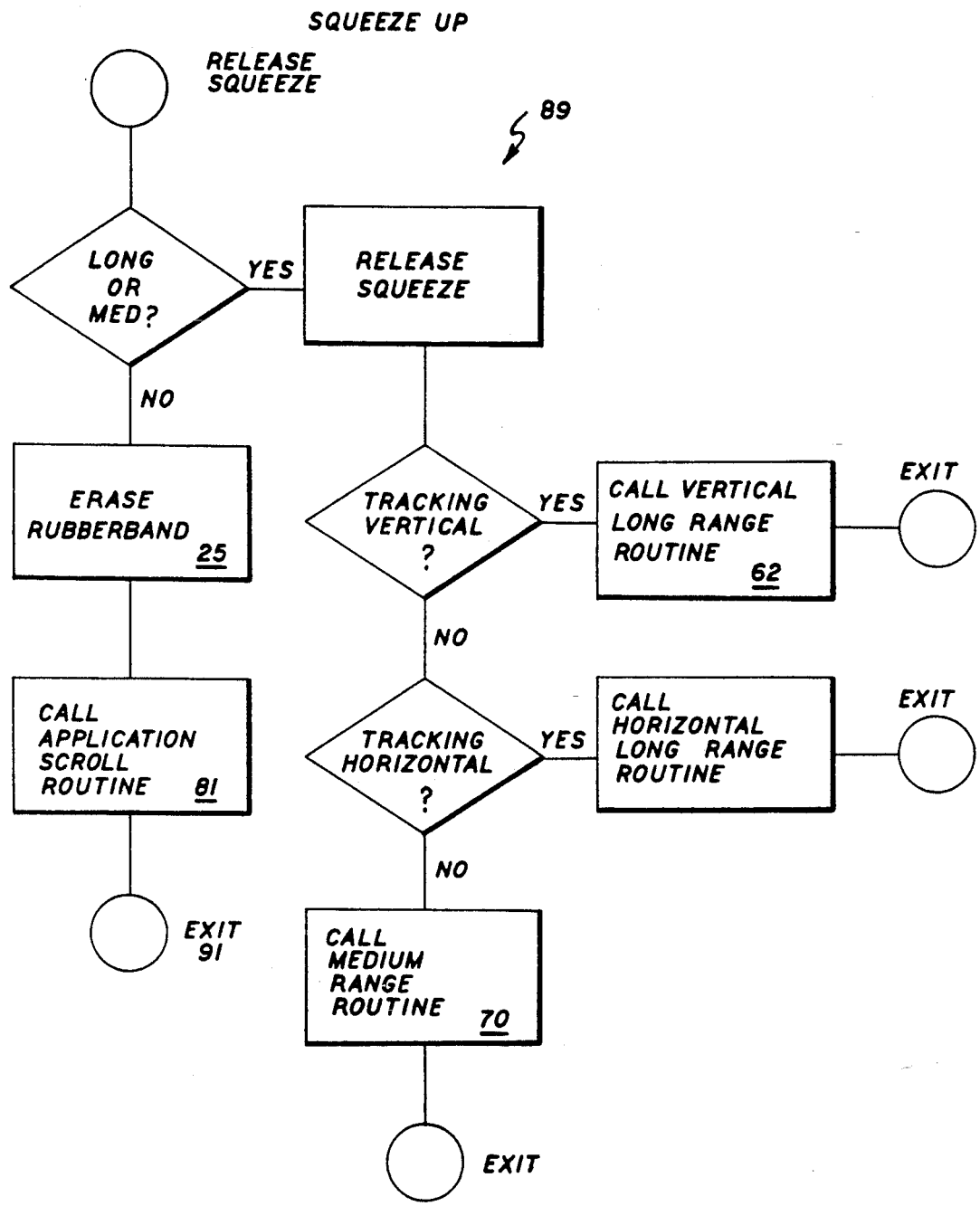

Upon movement of the arrow 15, the long range scrolling routine 69 of FIG. 6d is performed. The position of the cursor is analyzed with respect to the vertical and horizontal elevator bars 57, 59. If initially the vertical elevator bar 57 has been selected by the arrow 15 making contact with that bar 57 and a new window position has been selected by the arrow 15 moving the marker 65 within elevator bar 57, then the display is updated at 60 to reflect this movement. Further movement invokes the same sequence of steps in routine 69 of analyzing the position of the arrow 15 and updating of the display 60 to show the selected position of the marker 65 in the elevator bar 57. If a change from the vertical elevator bar 57 to the horizontal elevator bar 59 is made, then the vertical elevator bar 57 is restored to its initial display upon entry into the long range scrolling routine 69 and the horizontal elevator bar 59 is tracked and updated in the same manner that the vertical elevator bar 57 was with movement of the cursor 15.

After repositioning either marker 65, 67 in the respective elevator bar 57, 59 in the foregoing manner, release of the mouse below the threshold causes performance of the Release Squeeze routine 89 in FIG. 6e. In the case of long range scrolling, release of the mouse provides a vertical long range routine 62 or horizontal long range routine 64 to be called as is pertinent. Such routines, as are common in the art, provide for the changing from the initial position of the window contents to the desired window position as indicated by the repositioned marker 65, 67 in the respective elevator bar 57, 59. Thus, new window contents preceding or succeeding initial window contents, vertically or horizontally are displayed at 62, 64 in FIG. 6e.

In the case of medium range scrolling, a lower portion 66 of long range scrolling routine 69 in FIG. 6d is performed. In lower portion 66, arrowhead N, S, E, W of FIG. 5b is highlighted when arrow 15 is positioned thereon. If the cursor 15 is positioned on one of the arrowheads for a certain length of time as clocked at 68 in FIG. 6d, then a medium range routine 70 is called. The medium range routine 70 provides unit scrolling, that is scrolling a page at a time or a window load at a time. in accordance with the application and in the direction indicated by the chosen arrowhead. The medium range routine 70 continues scrolling in that manner as long as the cursor 15 is not moved from the selected arrowhead and the squeezing pressure is maintained above the predetermined threshold. If cursor movement or pressure release is detected then the medium range routine 70 is stopped and the long range scrolling routine 69 is exited.

If an arrowhead was selected and the squeezing is released before the predefined length of time has passed at 68 in FIG. 6d then, the application passes control to the "Release Squeeze" routine 89 shown in FIG. 6e. Because the "Release Squeeze" routine 89 is called from medium range scrolling actions of the user, the steps pertaining to long and short range scrolling in FIG. 6e are bypassed. Ultimately, the medium range routine 70 is performed and provides scrolling of window contents from a current position to the next unit position (i.e. from the current page to the next page, or from a current window load of columns, rows to the next window load of columns, rows) with respect to the application and in the direction indicated by the selected arrowhead. After the scrolling of one such unit the Release Squeeze routine 89 is exited and the application resumes control.

While the invention has been particularly shown and described with reference to a preferred embodiment thereof, it will be understood by those skilled in the art that various changes in form and details may be made therein without departing from the spirit and scope of the invention as defined by the appended claims. For example, a stylus or other implement for controlling the cursor may be constructed with squeezable parts which provide the foregoing scrolling features.

I claim:

1. Display control apparatus comprising:
   display generation means for generating and displaying a moveable entity and a cursor in a screen view, the display generation means being responsive to a first signal to position the cursor in the screen view and to a second signal together with the first signal to move the moveable entity from one screen position to another in the screen view; and
   a squeezable cursor control device having two opposed outward facing portions for receiving a squeezing force exerted by a user, the squeezable cursor control device coupled to the display generation means for generating the first signal under user control and for generating the second signal in response to at least the beginning and end of exertion by the user of a squeezing force of at least a predetermined magnitude, at the two opposed outward facing portions of the cursor control device, the display generation means responding to the first signal, the second signal marking the beginning of exertion of the squeezing force after the cursor is positioned at a predetermined screen position relative to screen position of the moveable entity, and the second signal marking the end of exertion of the squeezing force by causing the moveable entity to move to a screen position corresponding to the screen position of the cursor at a time when the second signal marking the end of exertion of the squeezing force is generated.

2. Apparatus as claimed in claim 1 wherein the squeezable cursor control device comprises a pressure sensitive switch positioned adjacent the two opposed outward facing portions, such that the switch is responsive to a squeezing force applied by the user at the two opposed outward facing portions to generate the second signal, the switch generating the second signal when a squeezing force of at least the predetermined magnitude is exerted by the user and again generating the second signal when the user ceases exerting the squeezing force.

3. Apparatus for moving entities in a screen view on a display controlled by computer means, comprising:
   display generation means coupled to the computer means for generating and displaying a cursor and moveable entities in a screen view on the display; and
   a cursor control device coupled to the computer means for generating cursor movement signals to selectively position the cursor in the screen view and for generating a control signal after the cursor is positioned at screen position of a moveable entity to move the moveable entity as a function of subsequent user placement of the cursor, the cursor control device having:
   two opposed outward facing portions; and
   a pressure sensitive switch positioned adjacent the two opposed outward facing portions such that squeezing of the two opposed portions operates the switch, the switch generating the control signal in response to a squeezing force applied at the two opposed portions by a user when the cursor is positioned at the screen position of the moveable entity and thereafter maintained by the user,
   the display generation means responding to the generated control signal by displaying repositioning of the moveable entity as a function of subsequent user placement of the cursor using the cursor control device.

4. Apparatus as claimed in claim 3 wherein the cursor control device further includes:
   a motion transducer engageable with a surface for generating the cursor movement signals to the computer means indicative of movement of the device over the surface to selectively position the cursor in the screen view on the display.

5. Apparatus as claimed in claim 3 wherein:
   the displayed moveable entities include units of designated text in a screen view of text; and
   the display generation means is responsive to control signals generated with the cursor positioned on a unit of designated text and subsequent user placement of the cursor at a desired position in the screen view of text, by displaying the screen view of text reformatted with the unit of designated text at the desired position in the screen view of text.

6. Apparatus as claimed in claim 3 wherein:

the displayed moveable entities include icons, windows and menus; and the display generation means is responsive to control signals generated with the cursor positioned at screen position of a moveable entity and with subsequent user movement of the cursor, by displaying movement of the moveable entity in correspondence with the user movement of the cursor.

7. A method of moving entities on a display controlled by computer means, the steps comprising:

exhibiting a cursor and at least one moveable entity in a screen view on a display controlled by computer means;

in the screen view, positioning the cursor on an initial screen position of a desired moveable entity;

while the cursor is positioned on the initial screen position of the desired moveable entity, applying a squeezing force above a predetermined magnitude to two opposed outward facing portions of a cursor control device coupled to the computer means;

while maintaining the squeezing force, moving the cursor through a multiplicity of screen positions, in a manner indicative of desired movement of the desired moveable entity; and displaying in the screen view on the display the desired moveable entity being moved from the initial screen position through the multiplicity of screen positions of the moving cursor, such that the moveable entity is displayed moving in the screen view in a manner corresponding to movement of the cursor.

8. A method as claimed in claim 7 wherein the steps of positioning and moving the cursor include moving the cursor control device across a surface to generate motion signals to the computer means to selectively position the cursor in the display.

9. A method of repositioning entities on a display controlled by computer means, the steps comprising:

exhibiting a screen view having a cursor and at least one moveable entity on a display controlled by computer means;

positioning the cursor on screen view position of a desired moveable entity;

while the cursor is positioned on the screen view position of the desired moveable entity, applying a squeezing force above a predetermined magnitude to two opposed outward facing portions of a cursor control device coupled to the computer means, and thereafter maintaining the squeezing force;

repositioning the cursor to a user selected position in the screen view; and displaying the screen view rearranged with the desired moveable entity positioned at the user selected position in the screen view.

10. A method as claimed in claim 9 wherein:

the screen view is a screen view of text;

the desired moveable entity is a user designated block of text; and the step of repositioning the cursor includes moving the cursor across the screen view to the user selected position therein by moving the cursor control device while maintaining the squeezing force, and releasing the squeezing force once the cursor is positioned at the user selected position.

11. A display system controlled by computer means and displaying a view with various active areas, one active area having scrollable contents, the display system comprising:

a first display means coupled to the computer means for generating and displaying said active area with scrollable contents in a first position;

a cursor control device coupled to the computer means, the cursor control device having movement means for selectively positioning a cursor in the view relative to the active area and having two opposed outward facing portions, a squeezing force applied at said two opposed outward facing portions, with the cursor positioned relative to the active area, initiating scrolling of the scrollable contents from the first position to a second position, said two opposed outward facing portions while having the squeezing force applied thereto enabling the movement means to control position of the cursor to indicate the second position of the scrollable contents; and a second display means coupled to the computer means for generating and displaying said active area with the scrollable contents changing from the first position to the second position, such that the scrollable contents are scrolled as a function of cursor repositioning subsequent to application of the squeezing force at the two opposed outward facing portions that initiated scrolling and while the squeezing force is maintained.

12. A display system as claimed in claim 11 wherein the cursor control device comprises:

a mouse coupled to the computer means having
  (i) a motion transducer engageable with a surface for generating a motion signal to the computer means indicative of movement of the mouse over the surface, to selectively position the cursor in the view relative to the active area; and
  (ii) the two opposed outward facing portions positioned to operate a pressure operated switch communicating to the computer means, the switch being switched to a first state by a squeezing force below a predetermined amount applied to the two opposed portions to effect movement of the mouse relative to the surface, and the switch being switched to a second state by a squeezing force above the predetermined amount applied to the two opposed portions to effect scrolling of the scrollable contents from the first position to the second position.

13. A display system as claimed in claim 12 wherein the mouse comprises a cover having flexible vertical walls on which the two opposed portions are positioned, the pressure operated switch being operated by flexing and unflexing of the wall.

14. A display system as claimed in claim 11 wherein:

the movement means enables the cursor to be positioned in the active area at an origin at the time the squeezing force is applied at the two opposed portions, and thereafter while application of the squeezing force at the opposed portions is maintained, the movement means enables repositioning of the cursor to a new position in a manner which determines a length and direction of a path from the origin to the new position in a manner which determines a length and direction of a path from the origin to the new position to indicate the second position; and the second display means displays the scrollable contents being scrolled in a manner proportionate to the length and direction of the path.

15. A display system as claimed in claim 14 wherein the second display means displays the scrollable contents being scrolled upon release of the two opposed portions.

16. A display system as claimed in claim 11 wherein:
the movement means enables the cursor to be positioned in the active area at the time the squeezing force is applied to the two opposed portions, and thereafter while application of the squeezing force at the opposed portions is maintained, the movement means enables the cursor to be positioned in a non-central portion of the active area in a substantially stationary manner for a predetermined length of time, the non-central portion being associated with a succession of positions of the scrollable contents; and
the second display means, after the predetermined length of time, generating and displaying the active area with the scrollable contents continuously changing from the first position through the succession of positions until the two opposed portions are released.

17. A display system as claimed in claim 11 wherein:
the movement means enables the cursor to be positioned outside the active area at the time the squeezing force is applied to the two opposed portions; and
further comprising a third display means, the third display means in response to application of the squeezing force with the cursor positioned outside the active area providing an elevator bar newly displayed in the view wherein, while the squeezing force at the opposed portions is maintained, the movement means enables repositioning of the cursor to select from the newly displayed elevator bar the second position of the scrollable contents.

18. A display system as claimed in claim 11 wherein:
the movement means enables the cursor to be positioned outside the active area at the time the squeezing force is applied to the two opposed portions; and
a third display means in response to the squeezing force at the two opposed portions generates a display of a directional indicator providing indications of a plurality of directions in which the scrollable contents may be scrolled a unit at a time, such that while the squeezing force at the opposed portions is maintained, the movement means enables positioning of the cursor over the indication of one direction, and in response to a subsequent releasing of the two opposed portions, the second display means displays the active area with the scrollable contents being scrolled one unit in the one direction from the first position.

19. A display system as claimed in claim 11 wherein:
the movement means enables the cursor to be positioned outside the active area at the time the squeezing force is applied to the two opposed portions; and
a third display means in response to the squeezing force displays a directional indicator providing an indication for each of plural directions in which the scrollable contents may be scrolled a unit at a time, such that while the squeezing force is maintained, the movement means enables the cursor to be positioned over the indication of one direction for a predetermined length of time, the second display means subsequently displaying the scrollable contents being continuously scrolled from the first position one unit at a time in the one direction until the opposed portions are released.

20. A display system as claimed in claim 11 wherein the active area is a window.

21. A display system as claimed in claim 11 wherein the active area is divided into uniform sections, each section providing scrolling in a different direction when the cursor is positioned in that section for a predetermined length of time while the squeezing force is applied to the two opposed portions.

22. A display system controlled by computer means and displaying a window with scrollable contents in a screen view, the display system comprising:
a display means coupled to the computer means for generating and displaying the window with scrollable contents in a first position in a screen view;
a cursor control device coupled to the computer means, the device having positioning means for selectively positioning a cursor relative to the window in the screen view and (b) two opposed outward facing portions which in response to a squeezing force that moves the two portions toward each other activate scrolling of the scrollable contents as a function of screen position of the cursor at time of application of the squeezing force; and
a scrolling means coupled to the computer means, in response to application of the squeezing force at the two portions with the cursor positioned relative to the window at a user desired screen position in the screen view, the scrolling means determining screen position of the cursor and scrolling the scrollable contents as a function of determined cursor position.

23. A display system as claimed in claim 22 wherein:
the scrolling means further, in response to the squeezing force being maintained and the cursor being maintained in one position for a predetermined length of time, provides continuous scrolling of the scrollable contents until the two portions are released.

24. In a display system controlled by computer means for displaying a view with various windows including a window with scrollable contents, a method for scrolling contents of a displayed window comprising the steps of:
generating and displaying said view with a window having scrollable contents in a first position;
positioning a cursor in the view relative to the window by movement of a cursor control device, the cursor control device being coupled to the computer means;
squeezing two opposed outward facing portions of the cursor control device toward each other to effect scrolling of the scrollable contents as a function of position of the cursor during at least one of time of the squeezing and a time subsequent to the squeezing to effect scrolling; and
generating and displaying the view with the scrollable contents being changed from the first position to a second position in accordance with the function of position of the cursor during at least one of the time of squeezing and the time subsequent to the squeezing to effect scrolling.

25. A method as claimed in claim 24 wherein the step of squeezing includes operating a pressure operated switch coupled between the two opposed portions and the computer means, the switch being switched to a first state by a squeezing force below a predetermined amount applied to the two opposed portions to effect movement of the cursor control device relative to a surface, and the switch being switched to a second state by a squeezing force above the predetermined amount applied to the two opposed portions to effect scrolling of the scrollable contents of the window.

26. A method as claimed in claim 24 wherein:

the cursor control device comprises a mouse having a periphery cover with vertical walls on which the opposed portions are disposed; and steps of squeezing and releasing include respectively flexing and unflexing the vertical walls of the periphery cover.

27. A method as claimed in claim 24 wherein:

the step of positioning the cursor in the view includes positioning the cursor within the window, said squeezing of the two opposed portions toward each other establishing an origin in the window at the position of the cursor;

further comprising the step of repositioning the cursor to a new position within the window while squeezing the two opposed portions toward each other, the repositioning determining the length and direction of a path from the origin to the new position; and releasing the opposed portions such that the view is generated and displayed with the scrollable contents moving from the first position in a manner proportionate to the length and direction of the path.

28. A method as claimed in claim 24 wherein:

the step of positioning the cursor includes positioning the cursor within the window;

the step of squeezing the two opposed portions toward each other includes maintaining the cursor relatively stationary in a non-central area of the window for a predetermined length of time while squeezing the opposed portions toward each other, the non-central area corresponding to a succession of positions of the scrollable contents; and the step of generating and displaying the view includes displaying the view with the scrollable contents continuously changing from the first position through the succession of positions until the opposed portions are released.

29. A method as claimed in claim 24 wherein:

the step of positioning the cursor includes positioning the cursor outside the window;

further comprising the steps of displaying an elevator bar in response to the squeezing of the opposed portions toward each other with the cursor positioned outside the window, the elevator bar being newly displayed; and while maintaining said squeezing, repositioning the cursor to select from the newly displayed elevator bar the second position of the scrollable contents.

30. A method as claimed in claim 24 wherein:

the step of positioning the cursor includes positioning the cursor outside the window;

further comprising the steps of displaying a directional indicator in response to the squeezing of the opposed portions toward each other, the directional indicator providing an indication for each of plural directions in which the scrollable contents may be scrolled a unit at a time; and repositioning and maintaining the cursor over the indication of one direction for a predetermined length of time, in response to said repositioning and maintaining, the step of generating and displaying the view displaying the scrollable contents being continuously scrolled from the first position one unit at a time in the one direction until the opposed portions are released.

31. A method as claimed in claim 24 wherein:

the step of positioning the cursor includes positioning the cursor outside the window;

further comprising the steps of displaying a directional indicator in response to the squeezing of the opposed portions toward each other, the directional indicator providing an indication for each of plural directions in which the scrollable contents may be scrolled a unit at a time; and repositioning the cursor over the indication of one direction; and releasing the opposed portions, in response to said releasing, the step of generating and displaying the view displaying the scrollable contents being scrolled one unit in the one direction from the first position.

* * * * *